United States Patent
Sharma et al.

(10) Patent No.: US 8,572,183 B2
(45) Date of Patent: Oct. 29, 2013

(54) PANORAMIC VIDEO IN A LIVE MEETING CLIENT

(75) Inventors: Kapil Sharma, Woodinville, WA (US); Avronil Bhattacharjee, Redmond, WA (US); Sumeet Bawa, Sammamish, WA (US); Imad Yanni, Redmond, WA (US); Quinn Hawkins, Kirkland, WA (US); Alan Bridgewater, Issaquah, WA (US); Stella Chan, Sammamish, WA (US); Lei Tan, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 1710 days.

(21) Appl. No.: 11/561,414

(22) Filed: Nov. 19, 2006

(65) Prior Publication Data

US 2007/0299912 A1    Dec. 27, 2007

Related U.S. Application Data

(60) Provisional application No. 60/805,868, filed on Jun. 26, 2006.

(51) Int. Cl.
*G06F 15/16* (2006.01)

(52) U.S. Cl.
USPC ........... 709/206; 709/204; 709/205; 709/207; 709/228

(58) Field of Classification Search
USPC ................... 709/204, 205, 206, 207, 228
See application file for complete search history.

(56) References Cited

U.S. PATENT DOCUMENTS

| | | |
|---|---|---|
| 5,539,483 A | 7/1996 | Nalwa |
| 5,745,305 A | 4/1998 | Nalwa |
| 5,793,527 A | 8/1998 | Nalwa |
| 5,990,934 A | 11/1999 | Nalwa |
| 6,005,611 A | 12/1999 | Gullichsen et al. |
| 6,043,837 A | 3/2000 | Driscoll, Jr. et al. |
| 6,111,702 A | 8/2000 | Nalwa |
| 6,115,176 A | 9/2000 | Nalwa |
| 6,128,143 A | 10/2000 | Nalwa |
| 6,141,145 A | 10/2000 | Nalwa |
| 6,144,501 A | 11/2000 | Nalwa |
| 6,175,454 B1 | 1/2001 | Hoogland et al. |
| 6,195,204 B1 | 2/2001 | Nalwa |
| 6,219,089 B1 | 4/2001 | Driscoll, Jr. et al. |
| 6,222,683 B1 | 4/2001 | Hoogland et al. |
| 6,285,365 B1 | 9/2001 | Nalwa |
| 6,313,865 B1 | 11/2001 | Driscoll, Jr. et al. |
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |

(Continued)

OTHER PUBLICATIONS

Circarana photographic unit, last accessed on Sep. 21, 2004 at Http://Cinerama.topcities.com/circarama.html.

*Primary Examiner* — Karen Tang
(74) *Attorney, Agent, or Firm* — Lyon & Harr, LLP; Patrina A. Lyon

(57) ABSTRACT

The present panoramic video technique embodied in the unified client provides panoramic video and other data from various sources for live web-based conferencing applications. In one embodiment, the panoramic video is provided by a panoramic collaboration and communication device, termed a RoundTable Device (RTD). The RTD is a collaboration tool with a 360-degree camera and a microphone or microphone array that, together with the unified client, delivers an immersive conferencing experience that extends the meeting room across multiple locations. This enables live network meeting scenarios that were not possible before.

20 Claims, 8 Drawing Sheets

(56) References Cited

U.S. PATENT DOCUMENTS

| | | | |
|---|---|---|---|
| 6,346,967 B1 | 2/2002 | Gullichsen et al. |
| 6,356,296 B1 | 3/2002 | Driscoll, Jr. et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,515,696 B1 | 2/2003 | Driscoll, Jr. et al. |
| 6,539,547 B2 | 6/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,700,711 B2 | 3/2004 | Nalwa |
| 6,741,250 B1 | 5/2004 | Furlan et al. |
| 6,756,990 B2 | 6/2004 | Koller |
| 6,885,509 B2 | 4/2005 | Wallerstein et al. |
| 6,924,832 B1 | 8/2005 | Shiffer et al. |
| 2001/0038624 A1* | 11/2001 | Greenberg et al. ............ 370/352 |
| 2002/0034020 A1 | 3/2002 | Wallerstein et al. |
| 2002/0063802 A1 | 5/2002 | Gullichsen et al. |
| 2002/0094132 A1 | 7/2002 | Hoffman et al. |
| 2002/0154417 A1 | 10/2002 | Wallerstein et al. |
| 2003/0101247 A1* | 5/2003 | Kumbalimutt et al. ....... 709/221 |
| 2003/0142402 A1 | 7/2003 | Carbo, Jr. et al. |
| 2003/0193606 A1 | 10/2003 | Driscoll, Jr. et al. |
| 2003/0193607 A1 | 10/2003 | Driscoll, Jr. et al. |
| 2004/0001091 A1* | 1/2004 | Kressin ......................... 345/753 |
| 2004/0008407 A1 | 1/2004 | Wallerstein et al. |
| 2004/0008423 A1 | 1/2004 | Driscoll, Jr. et al. |
| 2004/0021764 A1 | 2/2004 | Driscoll, Jr. et al. |
| 2004/0252384 A1 | 12/2004 | Wallerstein et al. |
| 2004/0254982 A1 | 12/2004 | Hoffman et al. |

* cited by examiner

PANORAMIC VIDEO IN A LIVE MEETING CLIENT

This application claims priority under 35 U.S.C. Section 119(e)(1) of provisional application No. 60/805,868, filed Jun. 26, 2006 and entitled "Panoramic Video in a Live Meeting Client".

BACKGROUND

Every business depends on the free flow of information and ideas to improve their products and services. Effective collaboration between people both inside and outside an organization increases product quality, improves product or project development lead times, and reduces costs. However, effective collaboration is often difficult. One issue that hinders effective meetings is that often people are not physically co-located. Traveling to meetings can be very time-consuming when considering lengthy travel times, and can be expensive. For a two or three hour meeting people often will travel a day to the meeting and a day back, especially if the meeting is across country or located in another country or on another continent.

Web (intranet or Internet) meetings or other virtual meetings have become more and more popular thanks to the emergence of high speed Internet connections and reduced prices for high quality web cameras. Web conferences can save large amounts of time and money because meeting participants in remote places can almost instantaneously join a meeting without wasting time and money traveling to the meeting site. Often web meetings can be spontaneously planned because there is no need for airline or hotel reservations and a meeting of an hour or two need not take days of preparations and travel.

An issue with web meetings is that depending on the type of meeting different equipments may be necessary at the end user. For example, some web or Internet meetings are provided by subscribing to a service. These meetings are typically conducted over the Internet with a service provider providing a server to conduct the meeting, herein termed a meeting service server. The connections to the Internet for these types of meetings are sometimes dial up and often quite slow, much slower than a corporate network typically would be. Alternately, meetings can be conducted over a network that is owned by a corporation using a server, herein termed an office communication server, which may be presumed to have greater throughput speed and bandwidth than the World Wide Web or Internet. Typically, client equipment to interface with these two types of servers is specialized and only interfaces with one type of net meeting or the other.

SUMMARY

Availability of real-time, rich video from a variety of devices is a key feature in the present panoramic video technique and in the server/service that collaborates to enable video capability in a unified live meeting client. The unified live meeting client is otherwise termed as the unified client because it can operate with either an office communication server or a meeting service server without requiring specialized equipment or software.

The present panoramic video technique embodied in the unified client provides panoramic video and other data from various sources for live web-based conferencing applications. In one embodiment, the panoramic video is provided by a panoramic collaboration and communication device, termed a RoundTable Device (RTD). The RTD is a collaboration tool with a 360-degree view, a speaker and a microphone array that, together with the unified client, delivers an immersive conferencing experience that virtually extends the meeting room across multiple locations. This enables live network meeting scenarios that were not possible before. The present panoramic video technique can, using web-based equipments and techniques, provide a one presenter live meeting video broadcast, a conference room panoramic video broadcast, a multi-speaker broadcast and a one-to-one conference room broadcast where panoramic video of multiple sites is captured and transmitted.

The present panoramic video technique is hosted on a unified client that can be part of an enterprise server-client network that is part of an entity such as a corporate network. In this case the corporation or other entity owns the server and runs its own live meeting software via one or more servers that are employed for this purpose. Or the client may be on the Internet or other network and be subscribed to as a service that provides live meeting support (herein termed a live meeting service configuration). In this second configuration, the live meeting service, and therefore the live meeting service server, is provided by another entity than the meeting participants. The unified client also has the capability to seamlessly traverse firewalls and hence would work from home with an office communication on-premise server as a backend. In either configuration, the office communication server or meeting service configuration, the unified client is configured so that it can participate in either type of meeting without requiring different software or hardware. To the user of the unified client whether the unified client is connected to a live meeting service or an enterprise server (e.g., an office communication server) is transparent.

It is noted that while the foregoing limitations in existing techniques for overcoming web conferencing issues described in the Background section can be resolved by a particular implementation of the present panoramic video system and technique described herein, this technique is in no way limited to implementations that just solve any or all of the noted disadvantages. Rather, the present technique has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description, reference is made to the accompanying drawings that form a part hereof, and in which is shown by way of illustration specific embodiments of the disclosure. It is understood that other embodiments may be utilized and structural changes may be made without departing from the scope of the present disclosure.

1.0 The Computing Environment

Before providing a description of embodiments of the present panoramic video technique, a brief, general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
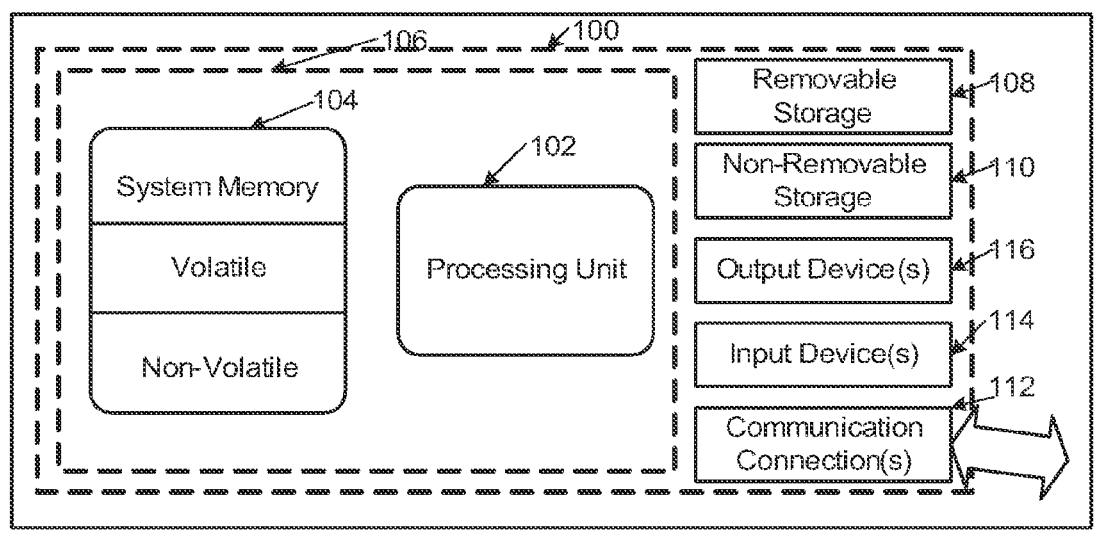
FIG. 1 is a diagram depicting a general purpose computing device constituting an exemplary system for implementing a unified client of the present panoramic video technique.

FIG. 1 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, camera, microphone, pen, voice input device, touch input device, etc. In particular, such input devices include a video camera, a web camera and an omni-directional camera integrated with a microphone array (e.g., an RTD). Output device(s) 116 such as a display, speakers, printer, etc. may also be included.

Figure 2:
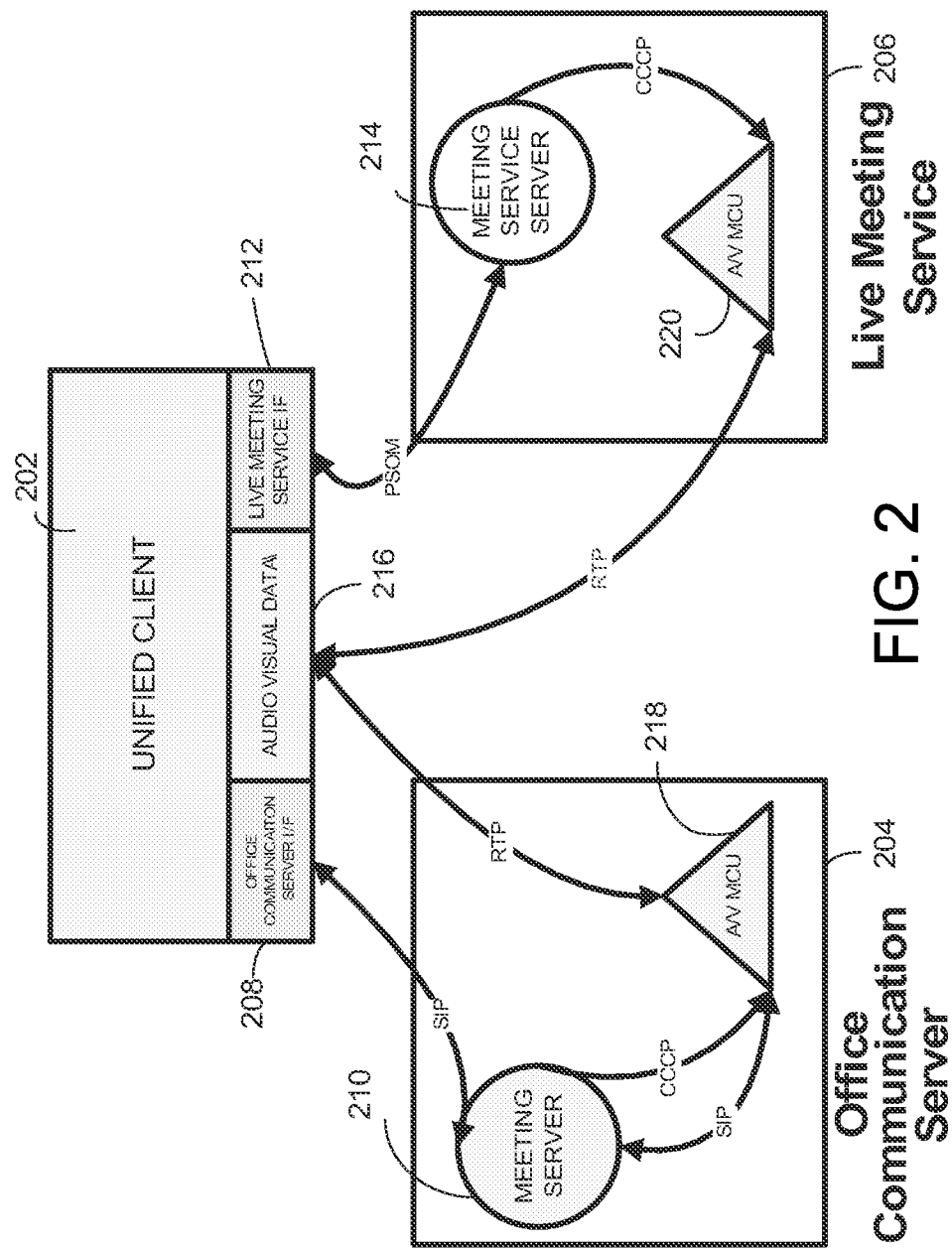
FIG. 2 is a diagram depicting a high level system architecture and environment employed in the present panoramic video technique.

The present technique may be described in the general context of computer-executable instructions, such as program modules, being executed by a computing device. Generally, program modules include routines, programs, objects, components, data structures, and so on that perform particular tasks or implement particular abstract data types. The process may also be practiced in distributed computing environments where tasks are performed by remote processing devices that are linked through a communications network, an example of which is shown in FIG. 2. In a distributed computing environment, program modules may be located in both local and remote computer storage media including memory storage devices.

The exemplary operating environment having now been discussed, the remaining parts of this description section will be devoted to a description of the program modules embodying the present system and technique.

2.0 Panoramic Video in a Live Meeting Client 2.1 Overview

Availability of real-time, rich video from a variety of devices is a feature in the present panoramic video technique which is embodied in a unified client that can interchangeably be used with a meeting service or a standalone client-server network (e.g., with an office communication server). The unified client is employed in conjunction with a server/service that collaborates to enable video capability in the client using a collaboration tool that provides an immersive conferencing experience. In addition to supporting video from a standard webcam, the unified client also supports a Round-Table Device (RTD) that is a collaboration tool with a 360-degree view, a speaker, a microphone array that essentially extends the meeting room across multiple locations by allowing multiple meeting sites to share the meeting experience. This enables scenarios not possible before.

In a live meeting service environment, which typically has demanding scaling requirements amidst low bandwidth networks, only single video feed is preferably streamed to and from a client. The RTD in this environment typically behaves as a standard webcam. The unified client running against an office communication server is expected to have the benefit of high bandwidth enterprise networks. In such a network streaming of panorama video in addition to the presenter video is possible.

2.2 Environment and Architecture

Various client and server components interact for rendering real-time video streams and associated audio in the unified client. Entities employed in the panoramic video technique are:

a. One or more contributing video sources. The present panoramic video technique employs one or more video sources, such as, for example, a standalone webcam, or a RTD. The webcam typically provides a single video stream and the RTD typically provides two video streams—an active speaker video stream, which automatically shows the person who is speaking, and the panorama video stream, which is the 360 degree view of the room. This is typically due to bandwidth constraints. It should be noted, however, that even though there is no panoramic video available at a first given site because it is only configured with a webcam, it may still receive and display panoramic video if another site is sending panoramic video. This is true whether the first site has a webcam or even no camera at all.

b. One or more unified clients—The present panoramic video technique includes one or more unified client(s) that render the video. They also receive audio/video (A/V) data from their own sources and send it on, and they receive A/V data over a network or the Internet. The unified client follows a layered model. Abstraction layers are built in the unified client to isolate it from the complexity of operating in a live meeting server configuration versus a live meeting service environment. In one embodiment, there is a distributed object (DO) which abstracts the signaling transactions between the unified client and office communication client server or the meeting service server. Similarly, conference control and media transactions between the client and an Audio Video Media Control Unit (AVMCU) which mixes and transmits the video may be abstracted. The code required for sending and receiving video streams are built on top of these infrastructure pieces. The present panoramic video technique also includes a User Interface layer at the unified client that allows set up, control and display of the system and data. The unified client can automatically detect a RTD in a unified client, including speaker, microphones and video streams of the RTD. It also provides the ability to modify behavior of acoustic echo cancellation between the RTD and any echo cancellation in the client. Typically this is done by turning off the acoustic echo cancellation at the unified client and only employing the echo cancellation processing in the RTD. The unified client can also process integrated audio such as voice over Internet Protocol (VOIP) and Public System Telephone Network (PSTN) using a RTD.

c. A meeting server—The present panoramic video technique includes a server entity that hosts the meeting either in the configuration of a meeting service or a stand-alone client-server network (e.g., in an office communication server configuration). The meeting server also includes a UI layer for configuring the server for receiving, sending, rendering video streamsand related notifications.

d. The Audio Video Media Control Unit (AVMCU)—The present panoramic video technique includes a server entity, the AVMCU, which mixes and transmits the video to the various clients as stated previously. This AVMCU server entity can be part of the meeting server (e.g., office communication server or the meeting service server) or the AVMCU can be a stand-alone server.

A general schematic of one version of the overall operating environment of the present panoramic video system is shown in FIG. 2. The present panoramic video system can interface in a Office Communications Server configuration 204 or a live meeting service configuration 206 without special equipments or software. The unified client 202 has an office communication server interface module 208 to interface with the office communication server 210 in the client-server configuration, and a meeting service interface module 212 to interface with the meeting service server 214 when operating in the meeting service configuration. The unified client 202 also has an audio video data module 216 which receives data from audio and video sources connected to the unified client 202 as well as receiving and sending audio and video data over the network to an audio video media control unit 218 connected to the meeting server 210, or to an audio video media control unit 220 connected to the meeting service server. It should be noted that FIG. 2 illustrates exemplary protocols (e.g., Session Initiation Protocol (SIP), PSOM (Persistent Shared Object Model), User Datagram Protocol (UDP), Hypertext Transfer Protocol (HTTP), Transmission Control Protocol (TCP) for the various elements discussed here to interface with each other. These protocols are just exemplary in nature, however, and other compatible protocols could be used.

2.3 System Overview and Environment

Figure 3:
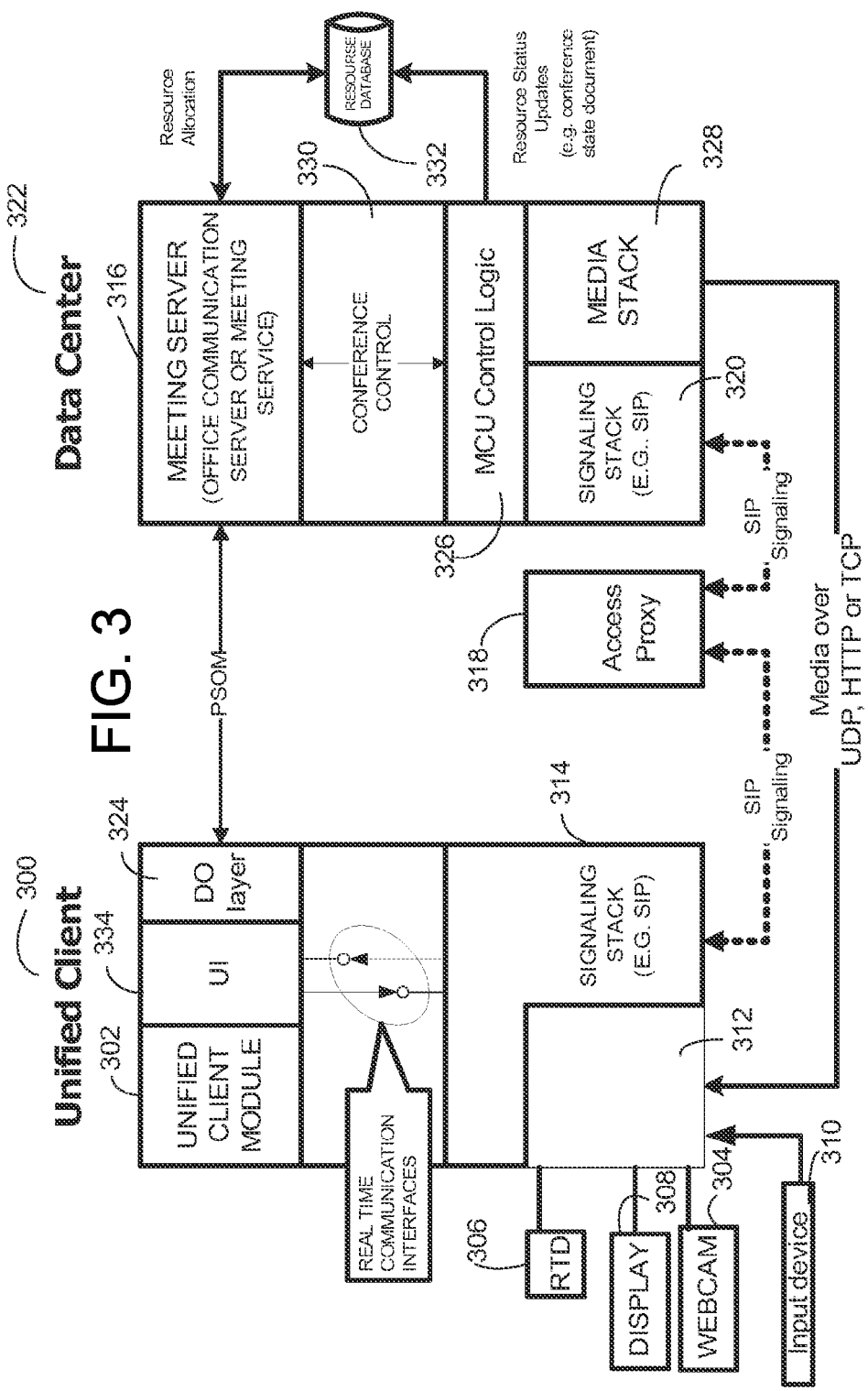
FIG. 3 is a diagram depicting the video architecture for a unified client employed in the present panoramic video technique.

One embodiment of a system diagram for the panoramic video technique embodied in a unified client is shown in FIG. 3. The unified client 300 includes a unified client module 302 and receives video streams from a contributing video source, such as a conventional web camera 304 or a RTD 306 (e.g., an omni-directional camera and a microphone or omni-directional microphone array). The unified client renders the video on a display 308 and also has an input device 310 such as a keyboard or mouse. The unified client also has a module for receiving and storing various real-time communication (RTC) media 312 and a module 314 for communicating with a meeting server 316 that could be an office communication server or meeting service server. If the meeting server is a office communication server this communication between the unified client and the office communication server typically takes place via a SIP protocol via an Access Proxy 318 which interfaces with a signaling stack 320 at the data center 322 that includes the server entities. The Session Initiation Protocol (SIP) is an application-layer control (signaling) protocol for creating, modifying, and terminating sessions with one or more participants. These sessions typically include Internet telephone calls, multimedia distribution, and multimedia conferences. It is widely used as signaling protocol for Voice over IP, along with H.323 and others. The communication between the unified client and the meeting service server preferably takes place via PSOM protocol via a Data Object layer 324. The unified client's user interface (UI) control takes place via a UI control module 334. The meeting server 316 (which may be an office communication server or a meeting service serve) is a server entity that hosts the meeting. The meeting server 316 also includes a Media Control Unit (MCU) 326 which keeps track of incoming media in a media stack 328 and the status of the meeting participants via a control module 330 and a resource database 332 in order to control the meeting. The MCU 326 includes an Audio Video Media Control Unit (AVMCU) that mixes and transmits the video to the various clients.

Figure 4:
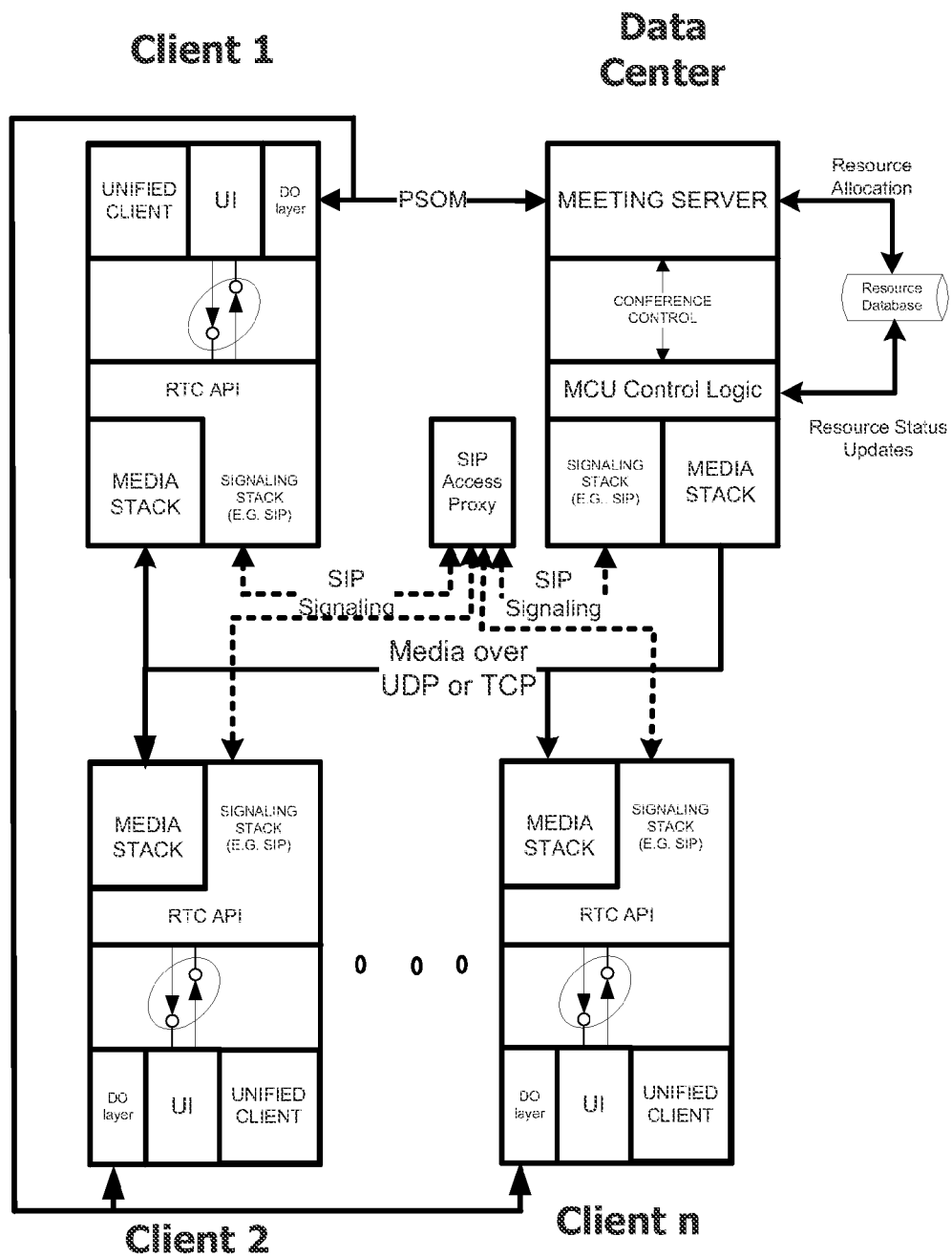
FIG. 4 is a diagram depicting more than one unified client employed in the present panoramic video technique.

The above discussed configuration can be extended to many clients as shown in FIG. 4.

2.4 Panoramic Video Process Via a Unified Client

Figure 5:
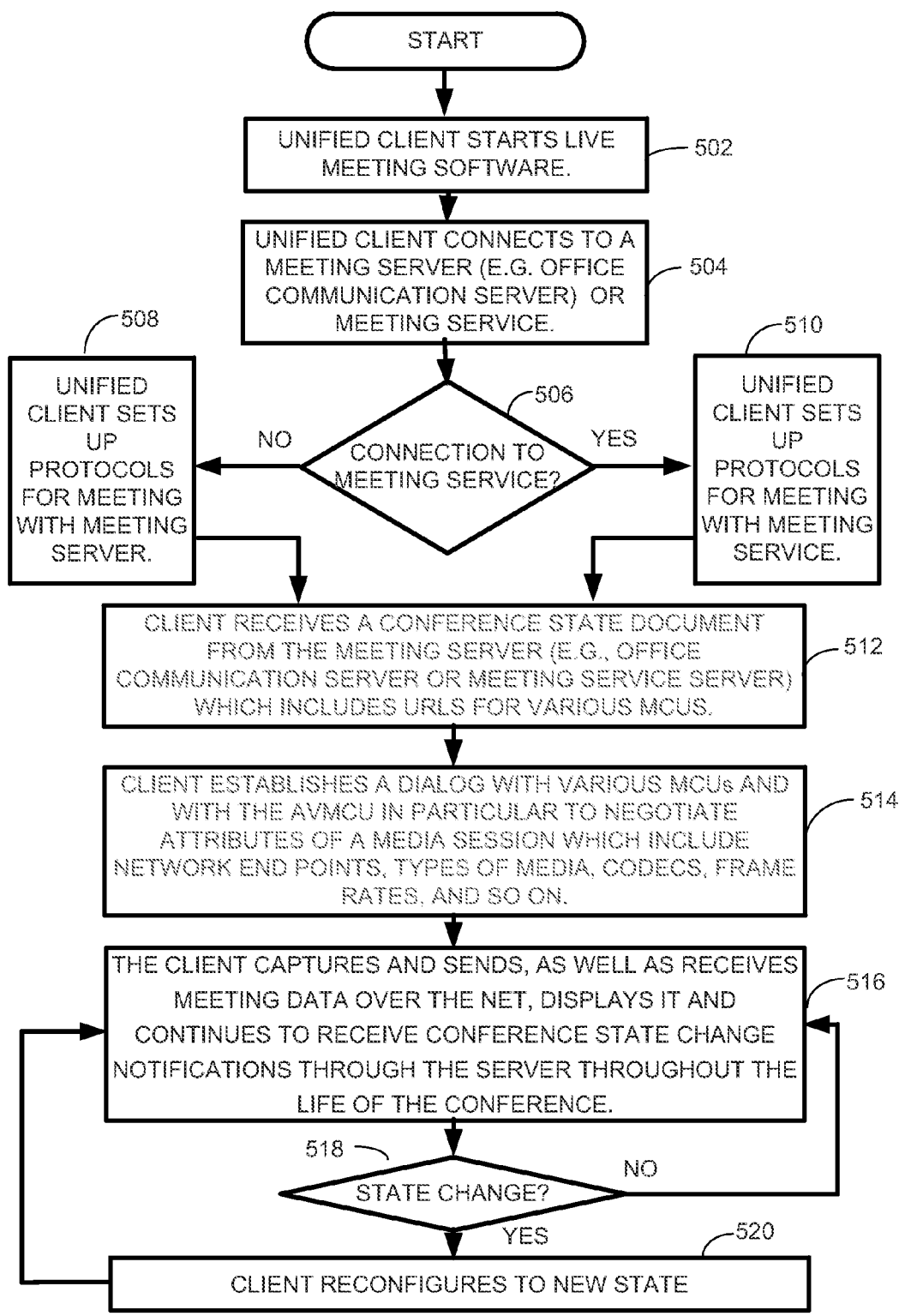
FIG. 5 is a flow diagram depicting one embodiment of the present panoramic video process which provides audio/video for a network conference.

A flow diagram for receiving and streaming panoramic video via a unified client is shown in FIG. 5. As shown in process action 502, the unified client launches the live meeting software. Once launched, the unified client first joins the conference by signing in to the meeting, as shown in process action 504. The unified client determines if the connection is with a live meeting service server or a live meeting client server, as shown in process action 506, and sets up to use the protocols needed (e.g., SIP for the live client server configuration, or PSOM for the meeting service configuration), as shown in process actions 506, 508, 510. The unified client then receives a conference state document from the meeting server that provides the unified client with the state of the meeting information such as the Uniform Resource Identifiers (URIs), compact strings of characters used to identify a resource, so as to enable interaction with representations of the resource over a network using specific protocols. The client then establishes a dialog with various network entities in general (e.g., via SIP INVITE) and with the AVMCU in particular to negotiate attributes (e.g., via Session Description Protocol (SDP), which is a format for describing streaming media initialization parameters) of a media session which include network end points, types of media (audio or video), codecs, frame rates, and so on, as shown in process 514. The unified client continues to receive conference state change notifications from the respective server through the life of the conference, as shown in process 516, 518, 520, reconfiguring as necessary to comply with the changed states provided in state change notifications.

2.5 Scenario(s) of Use

The following paragraphs provide some exemplary scenarios wherein the present panoramic video system and technique embodied in a unified client can be employed.

2.5.1 Presenter Video Broadcast (Webcam/RTD)

Figure 6:
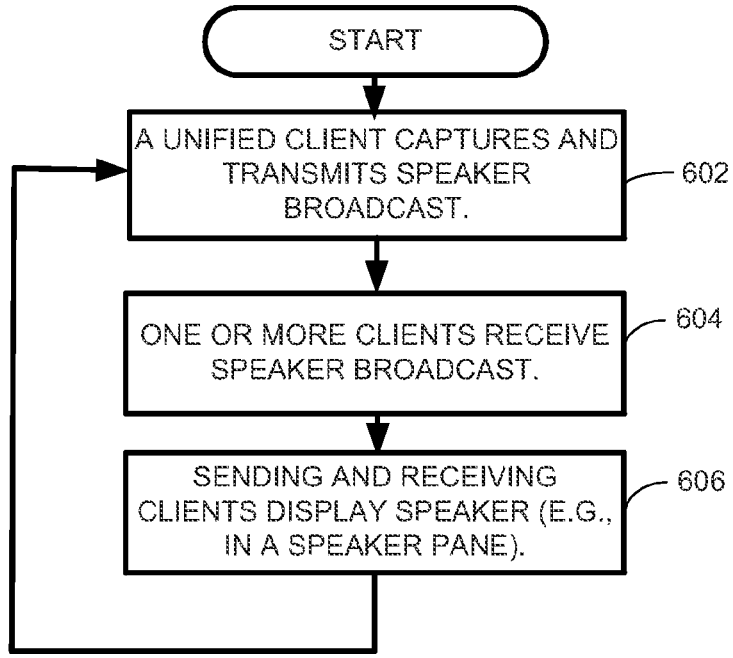
FIG. 6 is a flow diagram depicting a speaker or presenter video broadcast process employed by one embodiment of the present panoramic video process.

In the presenter video broadcast, as shown in FIG. 6, one presenter broadcasts to one or more remote meeting sites. This presenter, or speaker, is manually selected in one embodiment of the present panoramic video technique. The presenter can be captured using a traditional web camera or a RTD. As shown in FIG. 6, process action 602, one unified client captures and transmits video of a speaker or presenter and transmits it via the A/V MCU in a speaker video broadcast. One or more clients receive the speaker or presenter video broadcast (process action 604). All meeting participants (e.g., clients) are able to display the presenter or speaker (e.g., the talking head of presenter) at their displays (process action 606), preferably in a speaker pane.

2.5.2 Conference Room Video Broadcast (RTD)

Figure 7:
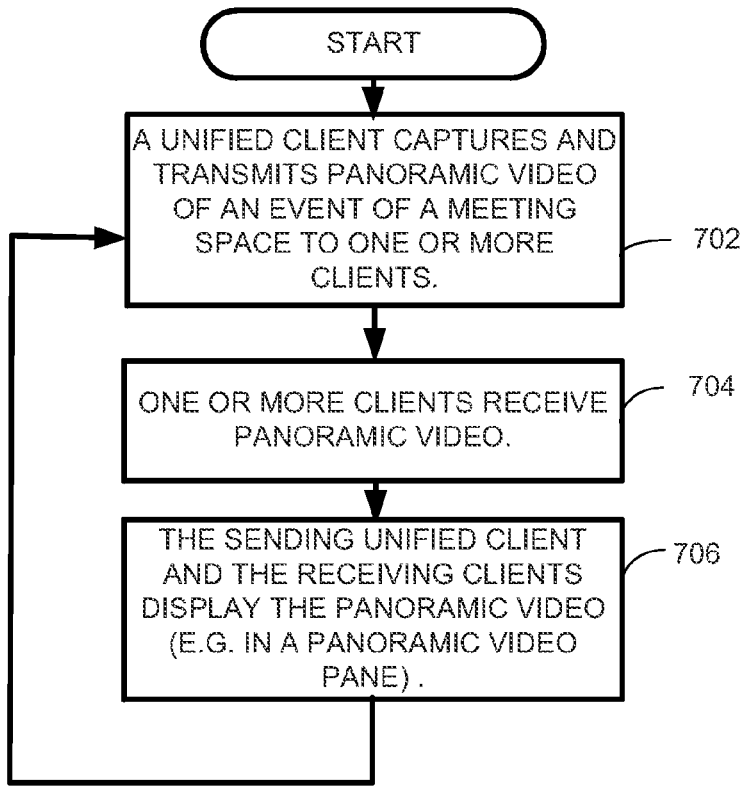
FIG. 7 is a flow diagram depicting a conference room video broadcast process employed by one embodiment of the present panoramic video process.

In the conference room video broadcast mode, as shown in FIG. 7, an RTD, or other omni-directional camera and microphone array, is used to capture panoramic video of conversations in a conference room and the unified client transmits it as a panoramic video broadcast (process action 702). One or more clients receive the panoramic video broadcast (process action 704), and are able to display the panoramic video of the transmitting unified client at their displays (process action 706), preferably in a panoramic video pane.

2.5.3 Multi-Party Speaker Video (Webcam/RTD)

Figure 8:
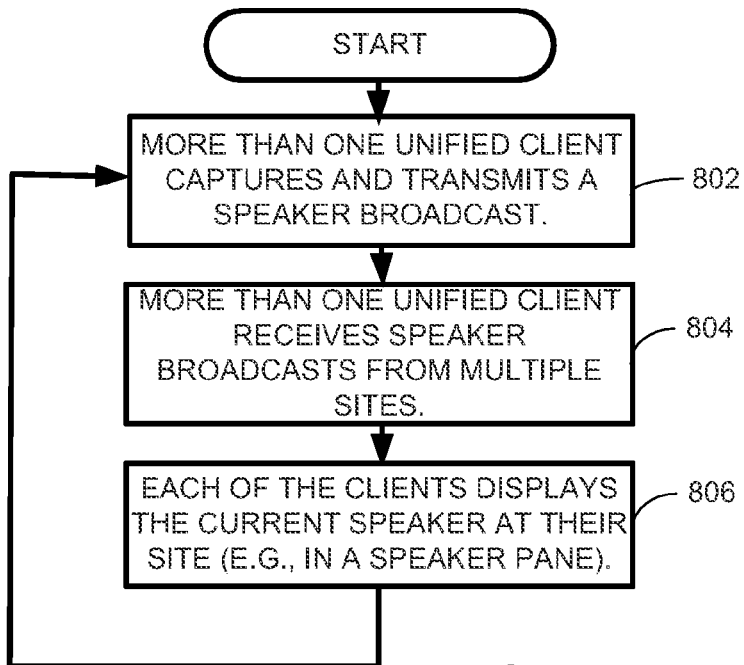
FIG. 8 is a flow diagram depicting a multi-party speaker video broadcast process employed by one embodiment of the present panoramic video process.

In the Multi-Party Speaker video mode, shown in FIG. 8, video of the current speaker is captured via a conventional web camera or a RTD or both and is seen by all meeting participants, whether they are locally or remotely located. The view of the current speaker, preferably displayed in the speaker pane, may be manually controlled or automatically switched by media control logic (e.g. MCU Audio) in the server or service from meeting site to meeting site. Sound source localization can be used to identify the speaker via the RTD device within a local site. Additionally, the service/service may determine who the current speaker is between various sites based via conventional methods. As shown in FIG. 8, process action 802, more than one unified client captures a speaker video at their site and transmits their speaker video broadcast. The clients receive the speaker video broadcast from each of the other clients in the meeting (process action 804). Each of the clients displays the video of the currently speaking speaker at their displays (process action 806).

2.5.4 One-to-One Conference Room Video Relay (RTD)

Figure 9:
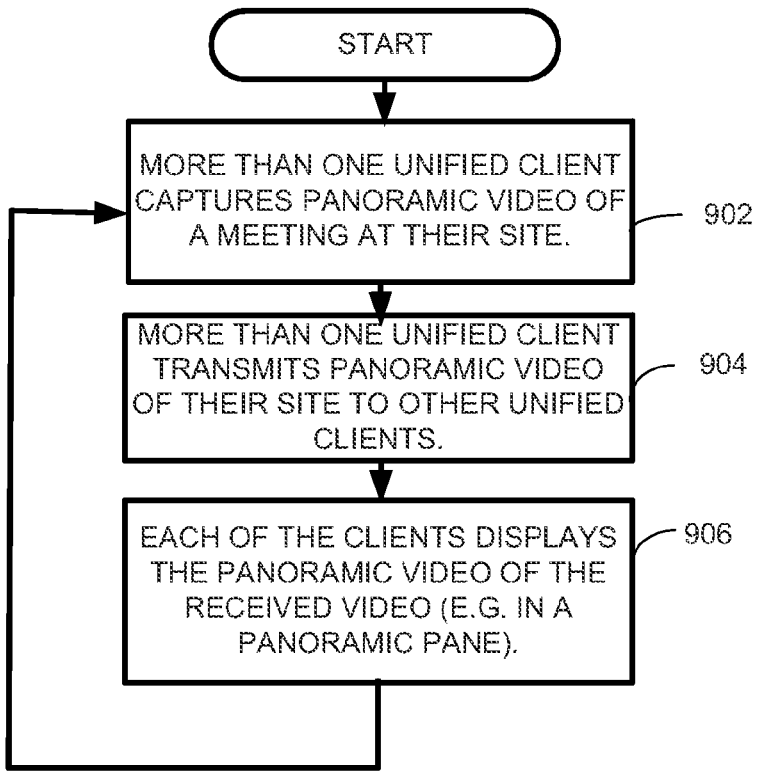
FIG. 9 is a flow diagram depicting a one-to-one conference room video relay process employed by one embodiment of the present panoramic video process.

In the One-to-One Conference Room Video Relay mode, shown in FIG. 9, it is also possible to have more than one meeting room equipped with a unified client and an RTD. In this mode panoramic panes for each of the meeting sites engaged in the meeting may be displayed at each client. As shown in FIG. 9, process actions 902, 904, more than one unified client captures panoramic video of a meeting at their site and transmits this panoramic video of their site to other unified clients via the live client server or live meeting service. Each of the clients displays the panoramic video of the others, an optionally the video conference of their own site, as shown in process action 906.

2.5.5 Alternate Embodiments/Modes of Operation

The scenarios/modes that are outlined above are better understood as transitory states within a conference. For example, the presenter broadcast mode becomes the multi-party speaker video mode if another presenter joins the conference and has a video source connected to her machine. Similarly, the scenario presenter broadcast mode becomes the conference room video broadcast if the conference is being held in a meeting service mode that does not have enough bandwidth to support a panorama video stream.

2.6 User Interface (UI) Module

Figure 10:
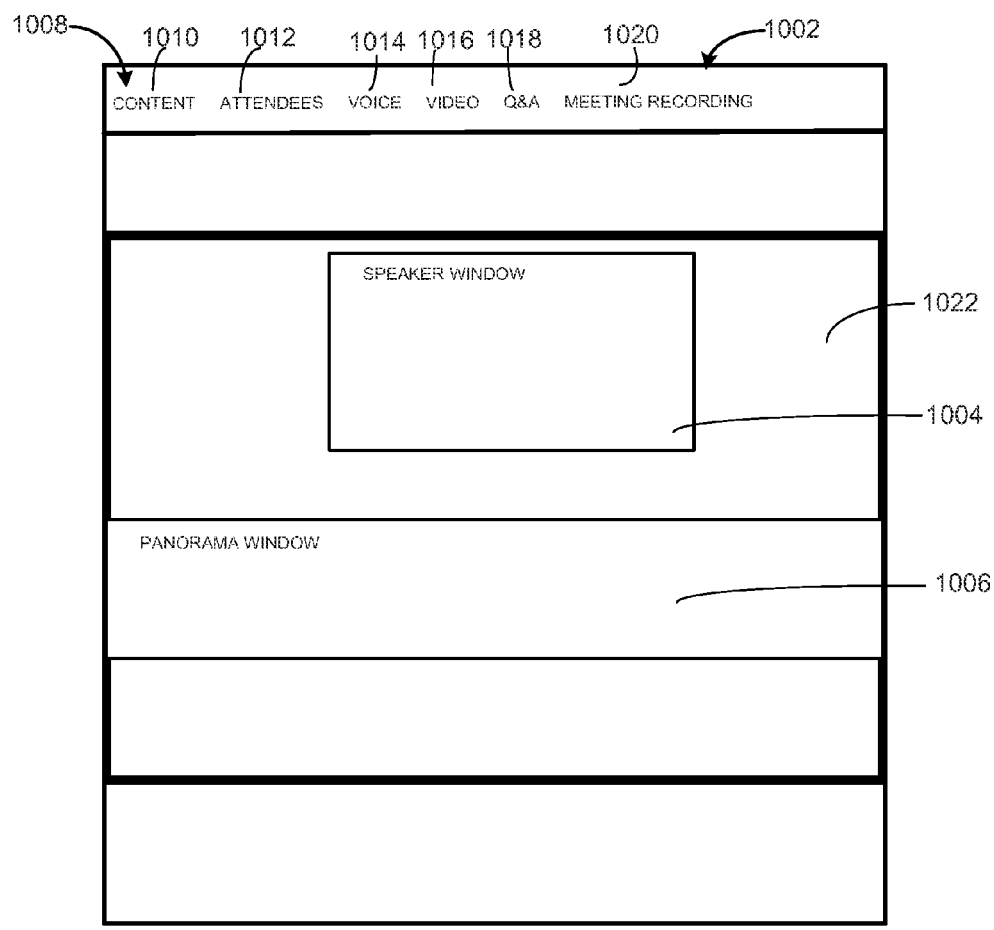
FIG. 10 is a diagram depicting an exemplary user interface for the present panoramic video technique wherein both a both a speaker window and a panoramic display pane are shown.

For each of the various video modes, the user interface (UI) and display may change. An exemplary display 1002 showing both a speaker pane 1004 and panoramic pane 1006 on the display of a unified client are shown in FIG. 10. The display 1002 has a tool bar 1008 with pull-down menus for accessing the meeting—they are: content 1010, attendees 1012, voice 1014, video 1016, questions and answers 1018 and the meeting recording 1020.

Conceptually, enabling video can be broken into two main modules—a user interface module and a controller module both which are resident in the unified client software/firmware. The UI module encompasses class(es) for the presenter and a panorama pane which is capable of rendering video or business card displays. The UI is capable of maintaining the aspect ratios of panes on resizing. It also shows the menus, buttons and any other controls. This UI module is supported by a controller module which processes meeting participant arrival/departure, active presenter changes, media available (e.g., whether presenter/panoramic video is available) and related notifications from the meeting server or AVMCU. The controller module also maintains the state of the conference at the unified client based on the conference state document received from the server (for instance, live client server versus live meeting service conference; synchronizing of the presenter video stream with the panorama stream, fetching of user names, business card and other data).

The UI can provide many capabilities. For example, the UI may provide the ability to tear off a video pane for both the speaker pane and panorama from the meeting client. Furthermore, it may provide the ability to maximize the speaker and panoramic video panes. In one embodiment, the UI provides the ability to render both the actual video streams being sent by the AVMCU as well as preview of the video streams captured by the locally attached webcam or RTD. Other capabilities that may be implemented in the UI are described in more detail below.

1. Command bar "Video" Button: The command bar video button 1016 allows the user to access the video menu which allows a user to specify what type of video they would like to receive.

2. Voice and Video Pane: The voice & video pane 1022 includes a dockable window which can be docked anywhere on the unified client's display. The speaker window 1004 and/or the panoramic window 1006 may be displayed in the voice & video pane. The voice and video pane may also include a Video Contributor Selector button and View buttons. It may have a window resize capability that resizes a window that is chosen by a user. The voice and video pane also has a full screen video mode wherein a chosen video (e.g., speaker window or panoramic window pane) is displayed on the whole screen. It is also possible to overlay text on the voice and video pane, for example, to provide additional user information. The video pane may also provide for presenter synchronization and user information tool tips.

3. User Info/Business Card Support. In one embodiment, the UI displays user information or a business card in the voice and video pane when video of the speaker is not available.

4. "Show video" Opt-in Dialog: In one embodiment the UI of the unified client will show a video opt-in dialog, which allows a user to decide whether they would like to receive any video transmitted to them.

5. Presenter Selection: A presenter selection menu may allow a user to decide which speaker should be designated as the presenter for purposes of displaying the speaker to the speaker video frame.

6. Local Video Preview: The present panoramic video technique also includes a preview mode that allows a user to view themselves before sending this video to other sites.

7. Pause control [including A/V behavior]: The UI of the present panoramic video technique may also include a pause control which includes pausing audio/video behavior.

8. Start/stop Receiving Video. The UI of the present panoramic video technique may also include a start/stop receiving video control.

9. Start/Stop Sending Video. The UI of the present panoramic video technique may also include a start/stop sending video control.

10. Panorama Pane: The panorama pane typically displays a panorama view of a meeting room and may include an enabling panorama button which enables the panoramic video display in the panoramic pane. The panorama pane can be dockable to a desired location on the display and can be resized and maximized while maintaining the aspect ratio of the window. It may also include placeholder text that allows for text to be entered when video is not available.

11. Panorama Stream Bonding: Panorama stream bonding allows for the synchronization of various video streams. For example, it allows synchronization of the panoramic video stream and the speaker video stream.

12. Video Tab In User Preferences: A video tab in a user preferences menu item can allow a user to select preferences to auto-send video, and to access camera settings and video set up.

13. "Attendee Can/can't Contribute Video" Permission— The UI may also include a permission setting that specifies whether an attendee can or cannot contribute video.

14. Video settings: In one mode, the user can manually set video settings to service or server.

It should also be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for streaming video from a client to other clients in a network comprising:
   initializing a meeting at a first client capable of both connecting to a meeting server or subscribing to a meeting service over a network without reconfiguration or action by a user;
   at the first meeting client determining whether a connection is to a meeting service or to a meeting server without action by the user;
   connecting the first client to said meeting server or meeting service over the network without action by the user;
   if the connection is to a meeting service, initializing protocols to receive and transmit data with protocols used for communicating with the meeting service;
   if the connection is to a meeting server, initializing protocols to receive and transmit data with protocols used for communicating with the meeting server;
   receiving a conference state document that defines the state of the meeting at said first client from the meeting server or meeting service and configuring meeting state at said first client in accordance with said conference state document;
   establishing a dialog between the client and meeting server or the meeting service to negotiate attributes of the meeting with one or more other clients;

capturing video associated with said meeting at said first client and sending it to the meeting server or meeting service;

receiving video data associated with said meeting at said first client from the one or more other clients; and displaying said video data captured by the first client and the video data received from the one or more other clients at said first client.

2. The computer-implemented process of claim 1 wherein audio data corresponding to the video data is captured by said first client and wherein audio data corresponding to video data is received from the one or more clients at said first client.

3. The computer-implemented process of claim 1 further comprising the process actions of:

said first client receiving a conference state change notification; and said first client automatically reconfiguring in accordance with the conference state change notification.

4. The computer-implemented process of claim 1 wherein the protocol used to communicate between the first client and the meeting server or meeting service is one of:

Session Initiation Protocol (SIP);
Hypertext Transfer Protocol (HTTP);
Persistent Shared Object Model (PSOM) protocol;
User Datagram Protocol (UDP); and
Transmission Control Protocol (TCP).

5. The computer-implemented process of claim 1 wherein the video captured by the first client or the data received from the one or more clients is panoramic video.

6. The computer-implemented process of claim 1 wherein the video captured by the first client or the data received from the one or more clients is video of a head of a person speaking.

7. A tangible computer-readable storage memory device having computer-executable instructions stored thereon, when implemented by a computer system, for performing the process recited in claim 1.

8. A computer-implemented process for streaming video from a client to other clients in a network comprising:

initializing a web meeting at a first client capable of interfacing with a meeting server entity that is either a meeting service or a meeting server;

at the first client determining whether the meeting server entity is a meeting service or a meeting server without action by a user;

the first client connecting to a meeting server entity without reconfiguration or action by the user via a network;

receiving at the first client after connection to the network a conference state document that defines the state of the meeting from the meeting server entity;

establishing a dialog between the first client and meeting server entity to negotiate attributes of a meeting with one or more other clients;

capturing video and audio data at said first client and sending it to the meeting server entity that mixes and transmits the video and audio data to the one or more other clients over the network;

receiving video and audio data associated with said meeting at said first client from the one or more other clients via the meeting server entity; and displaying said video captured at said first client and the video received from the one or more other clients at said first client, while playing the audio captured at said first client and the audio received from the one or more clients.

9. The computer-implemented process of claim 8 wherein the first client captures video of a speaker and transmits it to said one or more clients that display the speaker video.

10. The computer-implemented process of claim 8 wherein the first client captures and transmits panoramic video of a meeting space to said one or more clients that display the panoramic video.

11. The computer-implemented process of claim 8 wherein more than one client captures and transmits video of a speaker and transmits it to one or more clients that display the video of a speaker.

12. The computer-implemented video of claim 8 wherein more than one client captures and transmits panoramic video of the meeting space to one or more clients that display the panoramic video.

13. A tangible computer-readable storage memory device having computer-executable instructions stored thereon, when implemented by a computer system, for performing the process recited in claim 8.

14. The computer-implemented process of claim 1 wherein the first client displays controls for controlling and displaying the video capture and receipt, one or more panoramic video panes, and one or more speaker video panes for displaying video of a speaker speaking.

15. A system for streaming video from a client to other clients in a network comprising:

a server entity that controls a meeting over a network, wherein the server entity is either in the configuration of a meeting service or a stand-alone client-server;

one or more client computers that determine the configuration of a server entity without reconfiguration or action by a user and that receive and transmit video over the network via the server entity in the determined configuration of a meeting service or a stand-alone client-server without reconfiguration; and a stand-alone audio video media control unit hosted on a second server which interfaces with the server entity and mixes and transmits audio video data received from any client computer interfacing with the server entity to the other clients.

16. The system of claim 15 wherein at least one client of the one or more computers receives video from a camera connected to said at least one client computer.

17. The system of claim 16 wherein the camera captures:

360 degree panoramic video; and
video of a meeting participant's face that is speaking or last spoke.

18. The system of claim 16 the camera is a panoramic camera with an omni-directional microphone array.

19. The system of claim 16 wherein at least one of the client computers can also process integrated audio comprising voice over Internet Protocol (VOIP) and Public System Telephone Network (PSTN) using the panoramic camera with an omni-directional microphone array.

20. The system of claim 18 wherein a client computer can reconcile echo cancellation performed by the panoramic camera with an omni-directional microphone array and echo cancellation performed by the client.

* * * * *